United States Patent
Lewis et al.

(10) Patent No.: US 6,908,096 B2
(45) Date of Patent: Jun. 21, 2005

(54) COVER, INCLUDING HINGED DOOR, FOR TRAILER HITCH RECEIVERS OF MULTIPLE SIZES AND METHODS

(75) Inventors: Myron C. Lewis, Auburn, WA (US); Wes Bagley, Sandy, UT (US)

(73) Assignee: Uara Services, Inc., Auburn, WA (US)

( * ) Notice: Subject to any disclaimer, the term of this patent is extended or adjusted under 35 U.S.C. 154(b) by 0 days.

(21) Appl. No.: 10/404,603

(22) Filed: Apr. 1, 2003

(65) Prior Publication Data

US 2004/0046361 A1 Mar. 11, 2004

Related U.S. Application Data

(63) Continuation-in-part of application No. 10/236,411, filed on Sep. 6, 2002.

(51) Int. Cl.[7] .................................................. B60D 1/60
(52) U.S. Cl. ........................................ 280/507; 280/504
(58) Field of Search ................................ 280/504–507, 280/511; 16/225, 320, DIG. 13; D9/435

(56) References Cited

U.S. PATENT DOCUMENTS

| | | | | | |
|---|---|---|---|---|---|
| 3,152,716 | A | * | 10/1964 | Feldhahn ..................... | 220/230 |
| 3,596,926 | A | * | 8/1971 | Randall ....................... | 280/507 |
| 4,040,641 | A | | 8/1977 | Riecke | |
| 4,261,486 | A | * | 4/1981 | Bush et al. .................. | 222/517 |
| 4,726,091 | A | * | 2/1988 | Joyce ........................... | 16/227 |
| 4,852,902 | A | | 8/1989 | Young et al. | |
| 4,858,454 | A | * | 8/1989 | McAnulty, III .............. | 70/455 |
| 5,210,906 | A | * | 5/1993 | Aihara et al. ................ | 16/232 |
| 5,603,178 | A | | 2/1997 | Morrison | |
| 5,730,310 | A | * | 3/1998 | Yoshihara .................... | 220/835 |
| 5,934,699 | A | | 8/1999 | Blake | |
| 6,019,386 | A | | 2/2000 | Morelock | |
| 6,079,136 | A | * | 6/2000 | Kozlarek ..................... | 40/541 |
| 6,145,865 | A | * | 11/2000 | Cannara et al. ............. | 280/507 |
| 6,176,506 | B1 | | 1/2001 | Blake | |
| 6,438,595 | B1 | * | 8/2002 | Blumenau et al. .......... | 709/226 |
| 6,463,686 | B1 | * | 10/2002 | Eisenbraun .................. | 40/591 |

* cited by examiner

Primary Examiner—Lesley D. Morris
Assistant Examiner—L. Lum
(74) Attorney, Agent, or Firm—TraskBritt, PC (57) ABSTRACT

A receiver cover includes a stationary member that is configured to be secured to an end of a receiver for a trailer hitch. The receiver cover also includes a door which is hingedly connected to the stationary member. The door may be biased toward the stationary member, such as by one or more of a living hinge, a coiled spring, a magnetic field, or the like. Thus, when the receiver is not in use, the door automatically closes and is secured in a closed position over a receptacle in a receiver with which the receiver cover is used. When access to the receptacle of the receiver is desired, such as for coupling a trailer hitch therewith, the door may be opened against the bias so as to expose the receptacle.

19 Claims, 8 Drawing Sheets

COVER, INCLUDING HINGED DOOR, FOR TRAILER HITCH RECEIVERS OF MULTIPLE SIZES AND METHODS

CROSS-REFERENCE TO RELATED APPLICATION

This application is a continuation-in-part of U.S. application Ser. No. 10/236,411, filed on Sep. 6, 2002, now U.S Pat. No. 6,874,805, issued on Apr. 5, 2005.

BACKGROUND OF THE INVENTION

1. Field of the Invention

The present invention relates generally to receiver covers for receivers for trailer hitches and, more specifically, to receiver covers which facilitate access to the receptacle of a receiver while remaining secured to the outside of the receiver, as well as to receiver covers that may be secured to various sizes of receivers.

2. Background of Related Art

Many vehicles have been equipped with trailer-towing apparatus. For noncommercial vehicles, such as cars and light trucks (e.g., pickup trucks, sport utility vehicles, etc.), such trailer-towing apparatus are typically in the form of a permanent vehicle-mounted portion, which includes a receiver, and a trailer hitch, which is removably securable to the receiver, such as with one or more cotter pins or the like.

When the trailer hitch is not in use, but remains coupled with a receiver therefor, the trailer hitch may protrude a significant distance from the rear of a vehicle and may cause damage to structures or other vehicles. Also, when trailer hitches remain coupled with their receivers for long periods of time, moisture may become trapped therebetween, which may result in rusting or corrosion of one or both of the trailer hitch and the receiver, which may weaken them.

Even when a trailer hitch is removed from a receiver, exposing the end of the receiver may be somewhat undesirable. For example, an exposed end of a receiver may be unsightly. Also, dust, dirt, road debris, moisture, or combinations thereof may be introduced into the receptacle of the receiver, hindering subsequent use thereof, as well as facilitating corrosion of the receiver.

Various types of receiver covers have been developed to maintain a sightly appearance when a trailer hitch is not coupled with a receiver. Typically, conventional receiver covers include an inner receptacle into which an otherwise exposed end of the receiver is introduced, as well as an outer member which shields the end of the receiver onto which the receiver cover has been installed. Typically, the outer member and inner receptacle are integral with one another or fixedly secured to each other. Accordingly, when access to the receiver is desired, the entire receiver cover must be removed from the receiver and stored elsewhere. This often results in loss of receiver covers, as the storage location may be on the back bumper of the vehicle, on a trailer which has been coupled to the vehicle, or at some other unsafe location.

U.S. Pat. No. 6,019,386, issued to Morelock on Feb. 1, 2000 (hereinafter "the '386 patent"), describes another example of a receiver cover. The receiver cover of the '386 patent includes a pliable, resilient annular frame which is positionable around a receiver, with an end of the receiver protruding therethrough. A jacket of that receiver cover is secured to the resilient annular frame by way of a living hinge. The jacket, which is configured to secure to the end of the receiver around which the frame is positioned, includes an exterior perimeter element that is configured to be positioned around the outside of the receiver, as well as an interior perimeter element, which is configured to be inserted into the receptacle of the receiver. As the jacket is formed from a pliable, resilient material, when it is positioned over the end of a receiver, the exterior perimeter element and the interior perimeter element thereof may be stretched somewhat to secure the jacket to the end of the receiver. This configuration may, however, be somewhat undesirable since the end of the receiver must be aligned between the exterior and interior perimeter elements of the jacket before the jacket is installed on the end of the receiver. Moreover, the jacket must be manually reinstalled on the end of the receiver following each use of the receiver. Further, as the sizes of the exterior and interior perimeter elements of the jacket are relatively fixed and the exterior and interior perimeter elements are spaced a fixed distance apart from one another, the receiver cover of the '386 patent is useful with only one size of receiver.

Sometimes indicia, including the logos of car manufacturers or boat manufacturers, pictures, text, and indicia of various other types, are carried upon the outer members of known receiver covers. As is known in the art, however, it is difficult to secure and to maintain securement of indicia to pliable materials, especially those, like the material of the jacket of the receiver cover described in the '368 patent, which may be subjected to repeated external stresses.

Accordingly, there is a need for a receiver cover which may be readily installed on an end of receivers of a variety of different sizes, which provides ready access to a receptacle of the receiver without requiring removal from the receiver, to which indicia may be reliably secured, and which automatically covers the receiver when the receiver is not in use.

SUMMARY OF THE INVENTION

The present invention includes receiver covers that are configured to be secured to the receiver for a trailer hitch, which receiver is permanently mounted to an automobile to adapt the automobile to haul trailers that may be coupled with the type of trailer hitch to, in turn, be coupled with the receiver. A receiver cover that incorporates teachings of the present invention is configured to be secured to the outside of a receiver so as to be positioned over the receptacle of the receiver. Such a receiver cover includes a stationary member, which secures the receiver cover to the receiver, a door, which may be positioned to cover the receptacle of the receiver when the trailer hitch is not in use (i.e., in a closed position) or to fully expose the receptacle of the receiver to facilitate coupling of a trailer hitch thereto (i.e., in an open position), and a hinge, which couples the stationary member and the door to one another and facilitates movement of the door between such closed and open positions.

The stationary member of a receiver cover of the present invention is configured to at least partially surround the outer periphery of the readily accessible end of a receiver, with which the trailer hitch may be coupled. When the stationary member is properly positioned on the receiver, the receptacle of the receiver is fully exposed through an access aperture of the stationary member.

Additionally, the stationary member may be configured to fit onto receivers of a plurality of different sizes, as well as to accommodate or tolerate any variations in size between receivers of the same general size. By way of example only, size adjustment elements may be assembled with the stationary member so as to impart the stationary member with a size that will facilitate securing thereof to a receiver of a particular size.

The hinge of a receiver cover according to the present invention may be located at or near a periphery of the stationary member. The hinge may comprise a conventionally configured hinge or include multiple components. For example, a receiver cover of the present invention may include a conventional hinge with a hinge pin that is inserted through apertures of hinge elements of both the stationary member and the door. As another example, in addition to a conventionally configured hinge, one or more hinge elements of the door may cooperate with a living hinge located on the door, which may cause the door to be biased toward closing when placed in an open position.

The door may comprise a generally planar member, which, when in a closed position, substantially covers the receptacle of a receiver on which the receiver cover has been positioned. The door may have an ornamental appearance or have an ornamental element secured thereto. The door may also include a latch, which is configured to at least temporarily secure the door in a closed position.

A receiver cover according to the present invention may also include a biasing element which associates with one or both of the stationary member and the door in such a way as to bias the door from an open position to a closed position. Such a biasing element may also maintain the door in a closed position until an opening force is applied thereto to expose the receiver.

In use, a receiver cover that incorporates teachings of the present invention may be positioned on a receiver for a trailer hitch, with the stationary member thereof securing the receiver cover in position. In addition, when in a closed position, the door of the receiver cover covers the receptacle of the receiver. Until access to the receiver is desired, the door stays substantially in the closed position without having to be introduced into the receptacle of the receiver. When access to the receptacle of the receiver is desired, for example, so that a trailer hitch may be coupled with the receiver, the hinge that connects the door to the stationary member facilitates placement of the door in an open position. The coupling end of a trailer hitch may then be inserted into the receptacle and coupled with the receiver, as known in the art (e.g., with one or more cotter pins). Once the trailer hitch is no longer needed, it may be uncoupled from the receiver and removed from the receiver's receptacle. The door may then be moved to a closed position, in which the receptacle of the receiver is substantially covered. Such movement may be manually effected or automatically effected by way of one or more springs.

Other features and advantages of the present invention will become apparent to those of skill in the art through consideration of the ensuing description, the accompanying drawings, and the appended claims.

BRIEF DESCRIPTION OF THE DRAWINGS

In the drawings, which depict various features of exemplary embodiments of the present invention.

DETAILED DESCRIPTION

Figure 1:
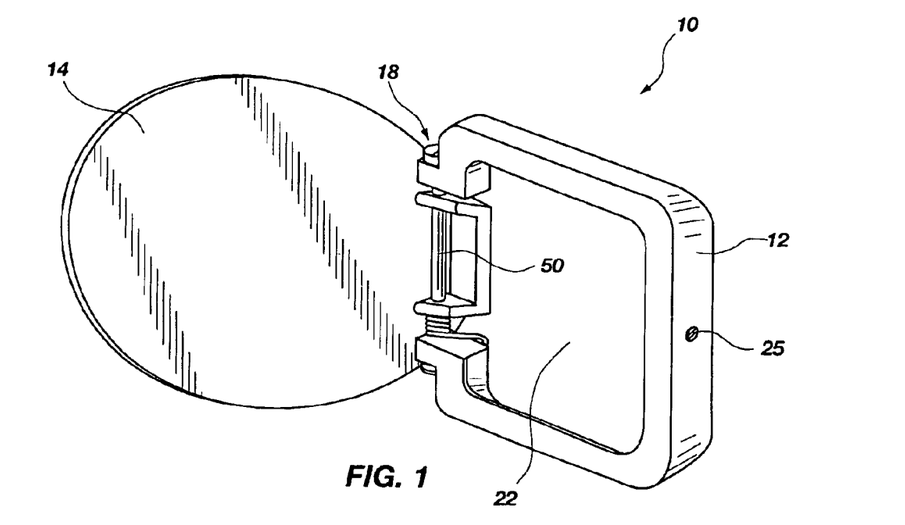
FIG. 1 is a frontal perspective view of a receiver cover that incorporates teachings of the present invention.

With reference to FIGS. 1 through 6, an exemplary embodiment of a receiver cover 10 that incorporates teachings of the present invention is depicted. As shown in FIG. 1, receiver cover 10 includes a stationary member 12 and a door 14. Stationary member 12 and door 14 are coupled with one another by way of a hinge 18.

Figure 2:
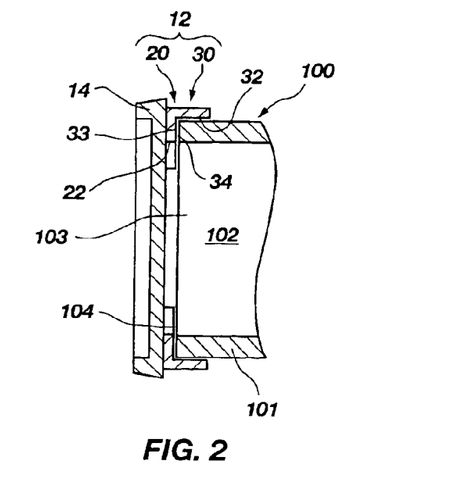
FIG. 2 is a cross-sectional representation of the receiver cover illustrated in FIG. 1, with the door thereof in a closed position.

As shown in FIG. 2, stationary member 12 includes a first end 20, to which hinge 18 couples door 14, and a second end 30, which is configured for coupling stationary member 12 to a receiver 100. An access aperture 22 formed through first end 20 of stationary member 12 provides access to a receptacle 102 of receiver 100. Access aperture 22 is continuous with a receiver coupling aperture 32 of second end 30. As depicted, access aperture 22 may have internal dimensions (e.g., AL and AW), taken transverse to the length of stationary member 12, that are smaller than the corresponding internal dimensions of receiver coupling aperture 32. As a result, a ridge 34 may be located at an interior end 33 of receiver coupling aperture 32, at the boundary between first end 20 and second end 30 of stationary member 12. Such a ridge 34 prevents stationary member 12 from sliding too far along the length of a receiver 100 and, thus, ensures that stationary member 12 will be properly positioned over an end 103 of receiver 100.

When assembled on a receiver 100, end 103 of receiver 100 is positioned within receiver coupling aperture 32, with an edge 104 of receiver 100 positioned proximate to or in abutment with ridge 34. In addition, access aperture 22 is continuous with receptacle 102 of receiver 100. Access aperture 22 and receptacle 102 may have substantially the same internal dimensions, as shown, to facilitate the insertion of a trailer hitch (not shown in FIG. 2) into access aperture 22, then into receptacle 102.

Figure 5:
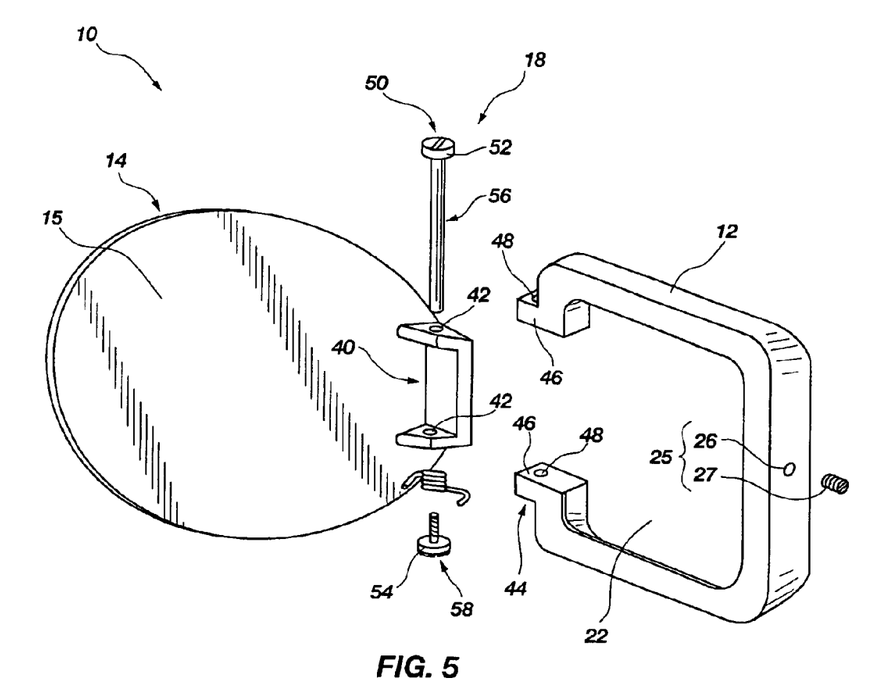
FIG. 5 is an assembly view of the receiver cover shown in FIGS. 1 through 4.

Stationary member 12 may additionally include one or more securing elements 25. As shown in FIG. 5, each securing element 25 includes a threaded aperture 26 and a complementarily threaded securing screw 27. Aperture 26 extends completely through second end 30 of stationary member 12. Securing screw 27 is configured to be introduced in aperture 26 and tightened against an adjacent region of an exterior surface 101 of receiver 100 (FIG. 2) or received within an aperture or recess (not shown) which is continuous with exterior surface 101.

Figure 7:
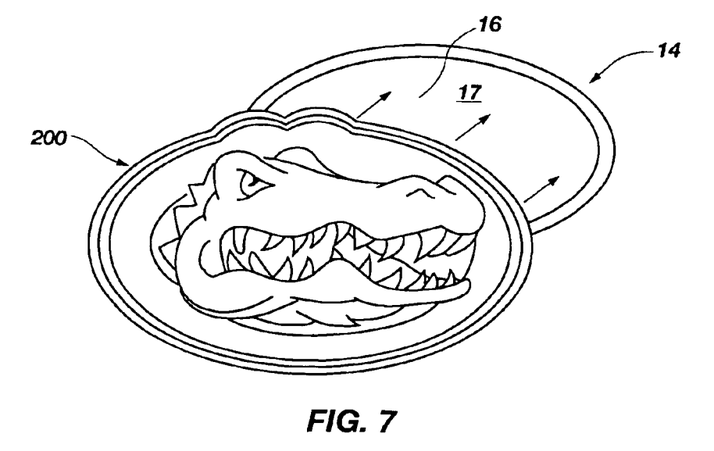
FIG. 7 illustrates an indicium installed onto an exterior surface of the door of the receiver member shown in FIGS. 1 through 6.

Door 14 may comprise a substantially planar member of virtually any shape and size, so long as the shape and size of door 14 are adequate for substantially covering access aperture 22 of stationary member 12 upon being positioned thereover. Although door 14 may be formed from any suitable material, including plastic, metal, rubber, or the like, it is currently preferred that door 14 be formed from a rigid material that facilitates securing of indicia 200 of various types (e.g., metal, plastic, etc.) to an exterior surface 16 thereof, as shown in FIG. 7. Such securing may, for example, be effected with suitable glues, cements, mechanical means (e.g., screws, pins, nuts and bolts, tabs and slots, etc.), or as otherwise known in the art. As best seen in FIG. 1, exterior surface 16 of door 14 may include a recessed area 17 which is configured to at least partially receive such indicia 200 (FIG. 7).

Figure 8:
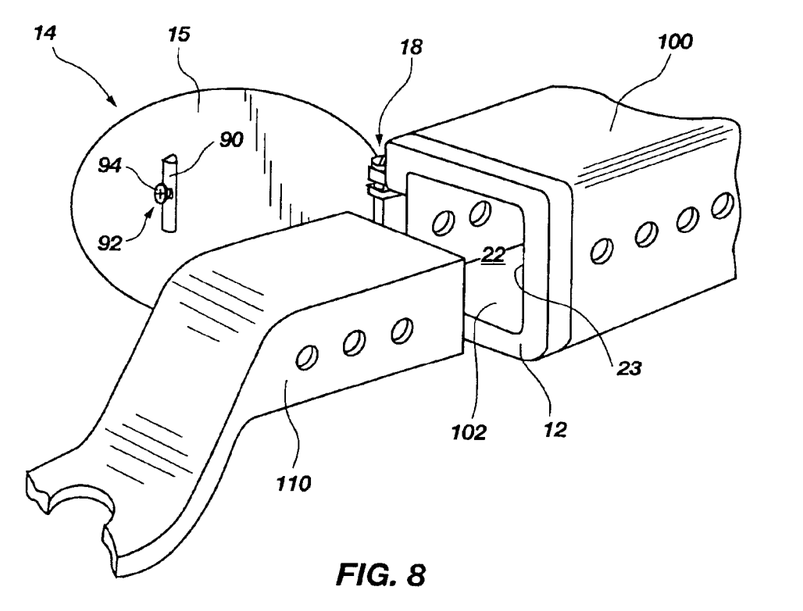
FIG. 8 depicts the door of the receiver cover shown in FIGS. 1 through 7 in an open position, as well as use of the receiver cover.

FIG. 8 depicts door 14 as including a wear reduction element 90 protruding from interior surface 15 thereof. As shown, wear reduction element 90 is an elongate element which protrudes from interior surface 15 of door 14 a sufficient distance that contact between door 14 and a trailer hitch 110 are minimized when trailer hitch 110 is coupled with receiver 100. Wear reduction element 90 may be located so as to be received within receptacle 102 of receiver 100 when door 14 is in the closed position.

Additionally, wear reduction element 90 may include a threaded aperture (not shown) which receives a set screw 92. An exposed head 94 of set screw 92 may be adjusted to a position at which it will contact an edge 23 of access aperture 22 when door 14 is in the closed position, minimizing vibration of door 14 and, thus, of receiver cover 10 when a vehicle with which receiver cover 10 is used is being driven. Set screw 92 may be adjusted outward to accommodate any wear to head 94 thereof or to edge 23 of access aperture 22 over time and, thus, so that such vibration of door 14 may be minimized following such wear. In the event that set screw 92 becomes too worn to prevent such vibration or gets lost, set screw 92 may be replaced.

Figure 3:
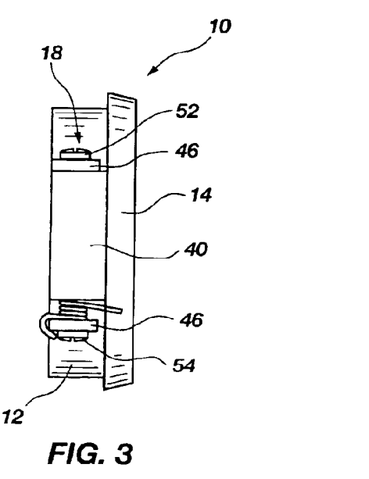
FIG. 3 is a first side view of the receiver cover of FIGS. 1 and 2.
Figure 4:
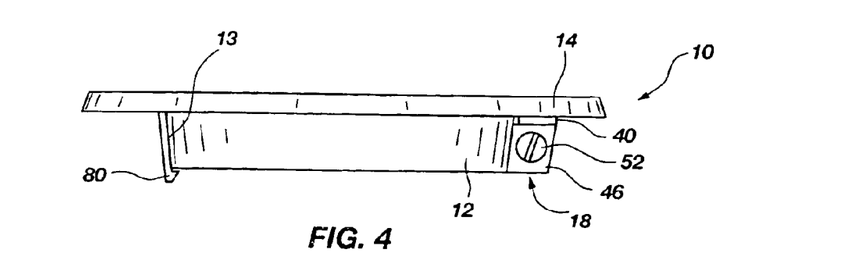
FIG. 4 is a top view of the receiver cover of FIGS. 1 through 3.

FIGS. 3 through 5 depict the elements of an exemplary hinge 18 for coupling door 14 to stationary member 12. Hinge 18 includes a first hinge member 40 which is integral with door 14 or is secured to an interior surface 15 thereof and which protrudes from interior surface 15. As shown, first hinge member 40 includes two apertures 42 which are in substantial alignment with one another. The depicted stationary member 12 of receiver cover 10 comprises a second hinge member 44 of hinge 18. Second hinge member 44 includes two coupling elements 46, each of which includes an aperture 48 formed therethrough. Like apertures 42, apertures 48 of coupling elements 46 are in substantial alignment. Coupling elements 46 are spaced a sufficient distance apart from one another that first hinge member 40 may be placed therebetween. Alternatively, a second hinge member may be secured to stationary member 12.

When door 14 and stationary member 12 are positioned properly relative to one another with first hinge member 40 and second hinge member 44 in an assembled relationship, apertures 42 of first hinge member 40 align with apertures 48 of second hinge member 44. A hinge pin 50, which extends through each of apertures 42 and 48, secures first hinge member 40 and second hinge member 44 to one another. Hinge pin 50 includes enlarged ends 52 and 54, which prevent hinge pin 50 from sliding out of apertures 42 and 48 and, thus, from becoming uncoupled from the remainder of hinge 18. As depicted, hinge pin 50 includes two members 56 and 58, each of which includes a single one of ends 52 and 54. Members 56 and 58 are securable to and removable from one another, such as by complementary threading, so as to facilitate introduction of hinge pin 50 through apertures 42 and 48 and, thus, assembly of hinge pin 50 with first hinge member 40 and second hinge member 44.

Although hinge 18 is shown as being positioned adjacent to a side of receiver cover 10, hinge 18 may alternatively be positioned adjacent to the top, bottom, or opposite side of receiver cover 10 and, thus, open in a different direction than that which is illustrated.

In any event, the features of hinge 18 are configured such that they do not interfere with the insertion of a trailer hitch (not shown in FIGS. 3 through 5) into receptacle 102 of receiver 100 (FIG. 2).

Figure 6:
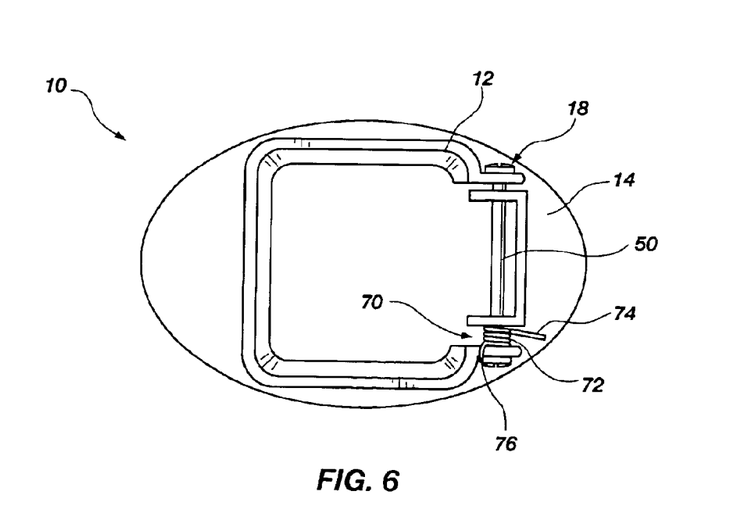
FIG. 6 is a rear view of the receiver cover depicted in FIGS. 1 through 5.

Referring now to FIG. 6, receiver cover 10 also includes a biasing element 70 which is associated with stationary member 12 and door 14 in such a way as to cause door 14 to be biased toward stationary member 12, or into a closed position. When used in conjunction with a door 14 that does not require precise alignment with an end 103 of a receiver 100 (FIG. 2), biasing element 70 facilitates the automatic covering of receptacle 102 of receiver 100 by door 14.

In the exemplary embodiment depicted in FIGS. 3 and 4, biasing element 70 comprises a coiled spring 72 which is positioned adjacent to or around a portion of hinge pin 50. Ends 74 and 76 of coiled spring 72 respectively abut stationary member 12 and door 14 in such a way that adjacent peripheral edges of stationary member 12 and door 14 which are located peripherally outside of hinge 18 are biased away from one another and, thus, the major portions of stationary member 12 and door 14, which are located on the opposite side of hinge 18, are biased toward one another. Ends 74 and 76 may be at least partially retained in position relative to stationary member 12 and door 14, respectively, by interference fit, by bends formed therein, or by way of retention notches (not shown) formed on opposing surfaces of stationary member 12 and door 14.

Of course, other types of biasing elements are also within the scope of the present invention, including other types of springs, magnets or magnetized elements, and the like.

Turning again to FIG. 4, door 14 may include a latch 80 which protrudes therefrom. Latch 80 is configured to engage a peripheral edge 13 or a corresponding feature on a peripheral edge 13 of stationary member 12. As shown, latch 80 is configured to be somewhat flexible so as to facilitate engagement and disengagement of stationary member 12 and, thus, temporarily retain door 14 in a closed position relative to stationary member 12.

Figure 9:
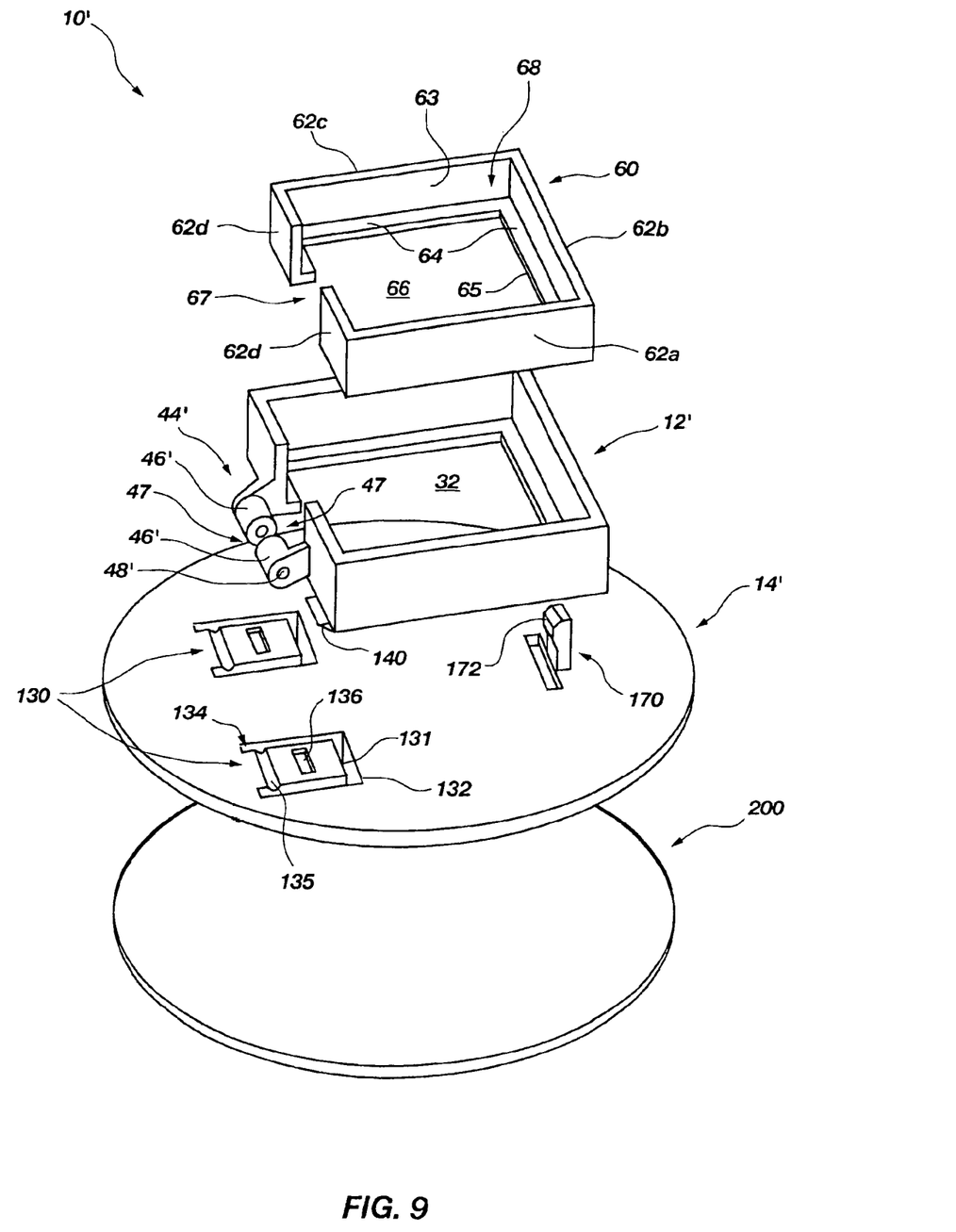
FIGS. 9 and 10 are assembly views of another embodiment of receiver cover that incorporates teachings of the present invention.
Figure 10:
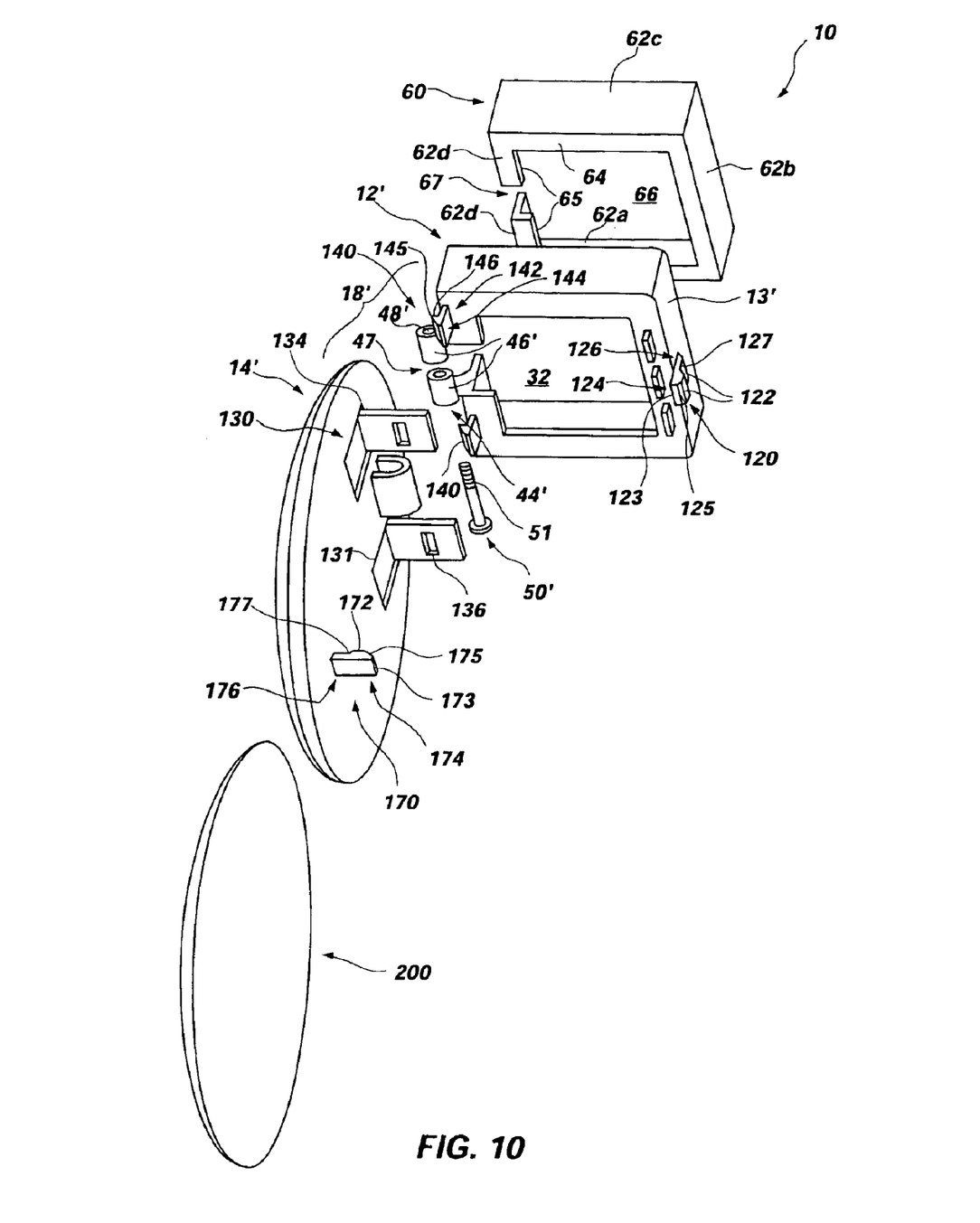
Figure 11:
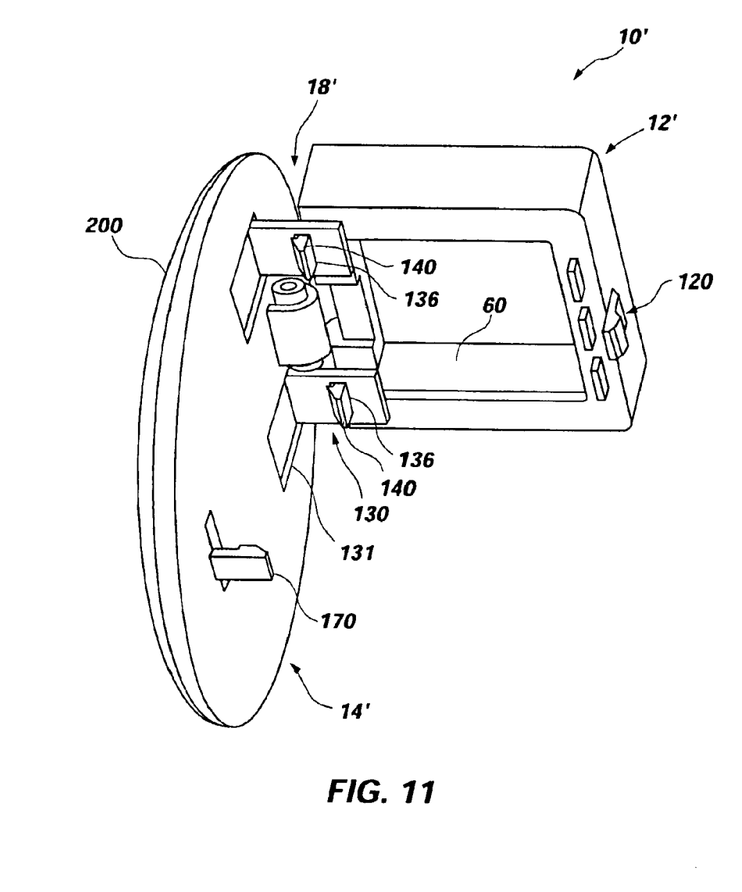
FIG. 11 is a perspective view of the receiver cover shown in FIGS. 9 and 10.

FIGS. 9 through 16 depict another exemplary embodiment of receiver cover 10' according to the present invention. Like receiver cover 10, and as shown in FIGS. 9 through 11, receiver cover 10' includes a stationary member 12' and a door 14' secured thereto by way of a hinge 18'. In addition, receiver cover 10' may include an indicium 200, which is securable to door 14'. Also, in order to facilitate securing of stationary member 12' to a receiver 100 (FIG. 8) of a particular size, receiver cover 10' may include one or more size-adjustment elements 60.

Stationary member 12' is configured much like stationary member 12 of receiver cover 10 (FIGS. 1 through 8) and functions in a manner similar to stationary member 12. In addition to the features of stationary member 12 that have been described above with reference to FIGS. 1 through 8, stationary member 12' includes a gap 47 between coupling elements 46' of a second hinge member 44' thereof. Gap 47 is configured to permit some movement, albeit limited, of stationary member 12', such that the distance between coupling elements 46' may be increased or reduced. This feature of gap 47 is particularly useful for accommodating size variations between different receivers that purportedly have the same dimensions, as well as to provide some tolerance in the dimensions of stationary member 12'.

In addition, the aperture 48' of one or both of coupling elements 46' that are fixed to stationary member 12' may be threaded (not shown) complementarily to threads 51 on an end of a singled-headed hinge pin 50' to be introduced therein. Threads 51 within coupling element 46' are, therefore, configured to engage threads 51 of hinge pin and, thus, to retain hinge pin 50' substantially in position relative to coupling element 46' and, thus, substantially in position relative to the remainder of hinge 18', stationary element 12', and door 14'.

Stationary member 12 may also include a guide 120, which protrudes therefrom, toward door 14'. Guide 120 is located at or adjacent to a peripheral edge 13' of stationary member 12', on an opposite side of stationary member 12' from the side of stationary member 12' with which hinge 18' is associated. In the depicted example, guide 120 includes an attached portion 126, which secures guide 120 to stationary member 12', and a protruding portion 124, which extends from attached portion 126 and, thus, from stationary member 12'. As shown, protruding portion 124 may be thicker than attached portion 126. Also, guide 120 may include tapers 125, 127, which are respectively located at a protruding end 123 thereof and at a transition between protruding portion 124 and attached portion 126.

Guide 120 includes an outer biasing surface 122 which is configured to receive an inner biasing surface 172 of a securing element 170 of door 14'. Securing element 170 may also include an attached portion 176, which attaches securing element 170 to door 14', as well as a protruding portion 174, which extends from attached portion 176 and, thus, protrudes from door 14'. In the depicted example, protruding portion 174 of securing element 170 is thicker than attached portion 176 thereof, although such a configuration is not required. In addition, securing element 170 may include tapers 175, 177 that are respectively located at a protruding end 173 thereof and at a transition between protruding portion 174 and attached portion 176.

Figure 12:
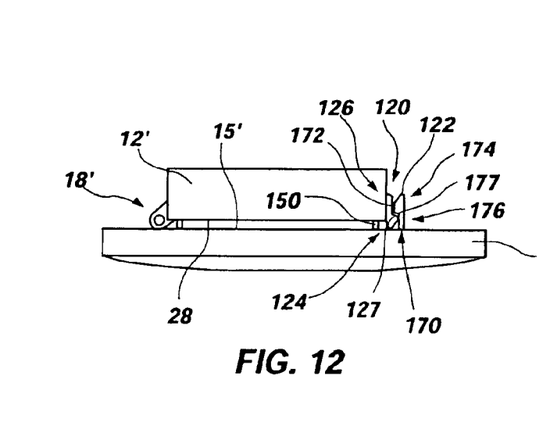
FIG. 12 is a top view of the receiver cover of FIGS. 9 through 11 with the door in a closed position.
Figure 13:
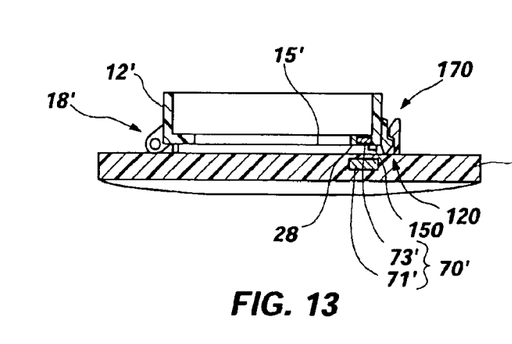
FIG. 13 is a cross-sectional representation of the receiver cover shown in FIGS. 9 through 12.

As depicted in FIGS. 12 and 13, when door 14' is in a closed position over stationary member 12', outer biasing surface 122 of guide 120 and inner biasing surface 172 of securing element 170 are in contact with one another, with protruding portion 174 of securing element 170 being positioned adjacent to attached portion 126 of guide 120, protruding portion 124 of guide 120 being positioned adjacent to attached portion 176 of securing element 170, and tapers 127 and 177 being located adjacent to one another. With this configuration, friction between outer biasing surface 122 of guide 120 and inner biasing surface 172 of securing element 170 is at least partially responsible for maintaining the closed position of door 14'. In addition, the abutting tapers 127 and 177 may provide additional friction and, thus, further maintain the closed position of door 14'. The thickness of at least one of attached portion 126 of guide 120 and attached portion 176 of securing element 170 may be configured to impart the respective guide 120 and/or securing element 170 with some flexibility such that door 14' may be moved into both an opened position and a closed position.

Of course, securing element 170 and guide 120 may be oriented oppositely (ie., the guide located inside of the securing element) without departing from the scope of the present invention.

With continued reference to FIGS. 12 and 13, one or more spacers 150 may additionally protrude from a door-facing surface 28 of stationary member 12', at an opposite side of access aperture 22 (not shown) thereof from that at which hinge 18' is positioned. Spacers 150 are configured to maintain a fixed distance between interior surface 15' of door 14' and door-facing surface 28 of stationary member 12' when door 14' is in the closed position. By spacing an adjacent portion of interior surface 15' of door 14' a fixed distance from door-facing surface 28 of stationary member 12', spacers 150 may also maintain substantially constant spacing between all portions of door-facing surface 28 and adjacent portions of interior surface 15' of door 14'.

Receiver cover 10' may also include a biasing element 70' that includes at least one magnet 71' and an attracted member 73', which is attracted to magnet 71'. As depicted in FIG. 13, magnet 71' is embedded within door 14', but may alternatively be continuous with an interior surface 15' thereof. Attracted member 73', which is shown as being embedded within a portion of stationary member 12' that is located adjacent to magnet 71' when door 14' is in a closed position, may comprise another, oppositely oriented magnet, or a material, such as iron, steel, or another ferrous material, that is attracted to a magnetic field. As an alternative to being embedded within stationary member 12', attracted member 73' may be continuous with a door-facing surface 28 thereof. As an alternative, magnet 71' may be positioned on stationary member 12' and attracted member 73' positioned on door 14'. In either configuration, as door 14' is permitted to move or be moved into the closed position, a magnetic attraction occurs between magnet 71' and attracted member 73', further facilitating movement of door 14' into the closed position. Additionally, the magnetic attraction between magnet 71' and attracted member 73' helps maintain the closed position of door 14'.

With returned reference to FIGS. 9 through 11, in addition to the above-described elements of door 14, door 14' includes at least one "living hinge 130," with two living hinges 130 being shown. As depicted, each living hinge 130 is a substantially planar member, located in and having outer dimensions which are at least slightly smaller than the inner dimensions of an aperture 131. Each aperture 131 and, thus, its corresponding living hinge 130, are positioned somewhat internally within door 14', near an outer periphery thereof. Each living hinge 130 includes an elongate hinge member 134 that secures the remainder of that living hinge 130 to an edge 132 of its corresponding aperture 131 and, thus, to door 14'. As shown, each hinge member 134 is integral with both door 14' and the remainder of its corresponding living hinge 130 and includes an elongate region of reduced thickness 135 relative to the adjacent portions of door 14' and the remainder of living hinge 130.

Each living hinge 130 also includes at least one aperture 136 formed therethrough, which aperture 136 is configured to receive tabs 140 that protrude from stationary member 12' at an area thereof with which other elements of hinge 18' are associated. As depicted, stationary member 12' has two tabs 140 protruding therefrom, with tabs 140 being positioned at opposite sides of gap 47, just outside of coupling elements 46' of second hinge member 44'. Each tab 140 includes an attachment portion 142 and a tapered portion 144. Attachment portion 142 secures tab 140 to stationary member 12', while tapered portion 144 extends from attachment portion 142 and, thus, from stationary member 12'. A ledge 146 is located at the junction between attachment portion 142 and a region of maximum thickness 145 of tapered portion 144. While region of maximum thickness 145 has a thickness which is at least slightly larger than a corresponding distance across aperture 136, the thickness of attachment portion 142 is smaller than that distance across aperture 136. Thus, as the tapering of tapered portion 144 facilitates forcing of tapered portion 144 into aperture 136, attachment portion 142 of tab 140 may reside within aperture 136, with ledge 146 securing tab 140 therein.

Region of reduced thickness 135 of hinge member 134 of each living hinge 130 has a relaxed state, in which living hinge 130 and door 14' are substantially coplanar, as well as a plurality of stressed states, in which the remainder of living hinge 130 is removed from the plane of door 14'. When all of the elements of receiver cover 10' are assembled and region of reduced thickness 135 is in a relaxed state, door 14' is in a closed position relative to stationary member 12'. While in a stressed state, region of reduced thickness 135 of hinge member 134 biases door 14' toward stationary member 12'.

Figure 14:
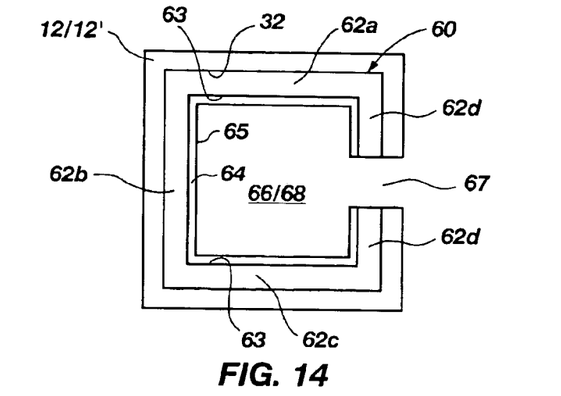
FIGS. 14 through 16 are rear views of a stationary member of the receiver cover of FIGS. 9 through 13 with different combinations of size adapters positioned within the coupling aperture thereof.
Figure 15:
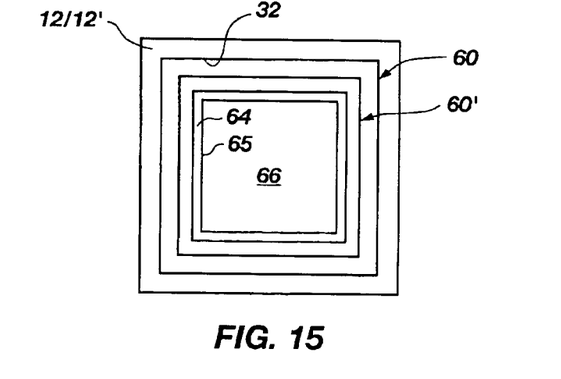
Figure 16:
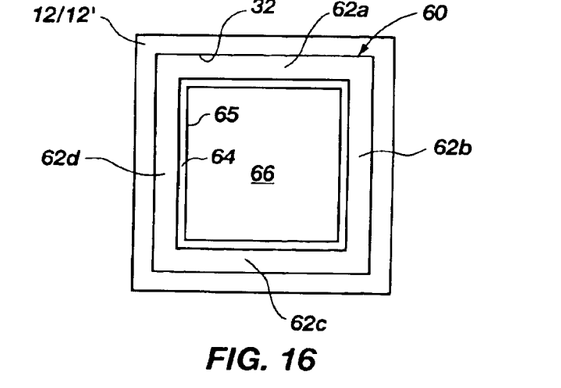

Turning now to FIGS. 14 through 16, one or more size-adjustment elements 60 may be assembled with stationary member 12, 12' to facilitate securing thereof to receivers 100 (FIG. 8) of different sizes. By way of example only, receiver coupling aperture 32 of stationary member 12, 12' may be sized to be disposed on an end of a two-inch receiver. As the dimensions of receiver coupling aperture 32 are substantially fixed, stationary member 12, 12' is too large to be properly positioned on smaller receivers. A size-adjustment element 60 or combination of size-adjustment elements 60, 60' may be positioned within receiver coupling aperture 32 to reduce the effective size thereof and, thus, to facilitate proper securing of stationary member 12, 12' to a smaller receiver.

As shown in FIGS. 14 and 16, a single size-adjustment element 60 is positioned within receiver coupling aperture 32 so as to reduce the effective size thereof. With additional reference to FIGS. 9 and 10, size-adjustment element 60 is substantially square in shape and includes four peripheral walls 62a, 62b, 62c, and 62d (collectively walls 62). The interior surfaces 63 of walls 62a–62d define a coupling aperture 68 of size-adjustment element 60, which is configured to receive either a receiver of corresponding size, or another, smaller size-adjustment element 60', as shown in FIG. 15. Thus, walls 62a–62d have thicknesses which at least partially reduce the effective size of receiver coupling aperture 32 of stationary member 12, 12'. When a combination of size-adjustment elements 60' are assembled with one another to tailor the effective size of receiver coupling aperture 32, size-adjustment elements 60 with walls 62 of the same thickness or a combination of different thicknesses may be used.

With continued reference to FIGS. 9, 10, and 14 through 16, each size-adjustment element 60 also includes a ledge 64 that extends substantially perpendicularly relative to walls 62a, 62b, 62c, and 62d. The interior edges 65 of ledge 64 define an access aperture 66 of size-adjustment element 60. Access aperture 66 has substantially the same dimensions as those of a receptacle 102 of a receiver 100 (FIG. 8) with which a receiver cover 10, 10' including size-adjustment element 60 is to be used.

As depicted in FIGS. 9, 10, and 14, one wall 62d and the corresponding portion of ledge 64 may be discontinuous, with a gap 67 being located between two discontinuous sections thereof. Like gap 47 of stationary member 12', gap 67 is configured to accommodate size variations between receivers of the same general size, as well as to provide at least some of the dimensional tolerance of size-adjustment element 60.

When size-adjustment element 60 is disposed within receiving coupling aperture 32 of stationary member 12, 12', ledge 64 thereof abuts ridge 34 (FIG. 2) within receiving coupling aperture 32 or a ledge 64 of another, larger size-adjustment element 60.

Figure 17:
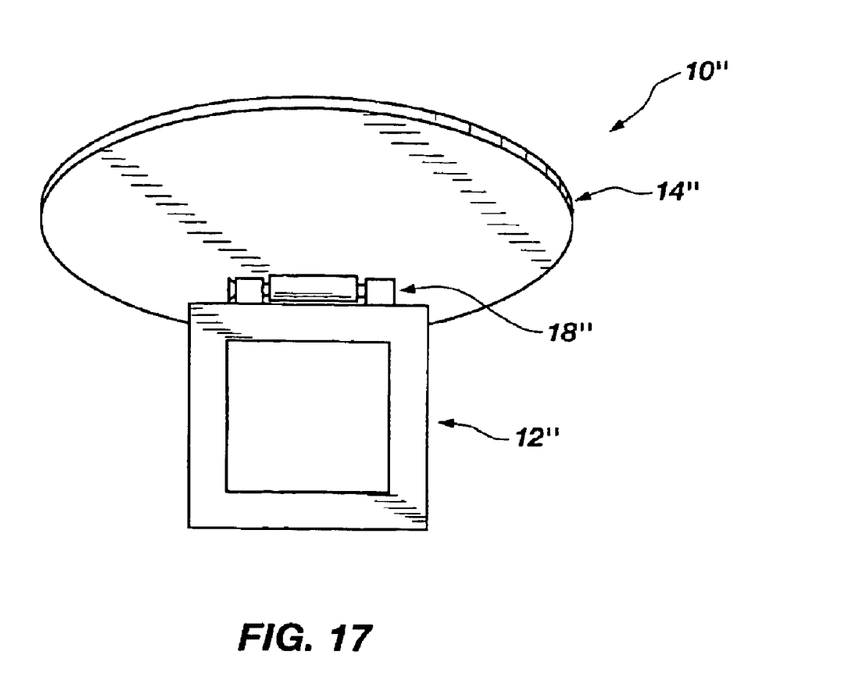
FIG. 17 is a perspective view of another embodiment of receiver cover of the present invention, which includes a hinge at the upper portions of the stationary member and door so that the door tilts upwardly when opened and downwardly when closed.

Turning now to FIG. 17, another embodiment of receiver cover 10" according to the present invention is depicted. Receiver cover 10" includes a hinge member 18" which joins a stationary element 12" and a door 14" near upper portions thereof and in such a way that door 14" pivots upwardly relative to stationary element 12" when placed in an open position and downwardly when placed in a closed position.

A receiver cover that incorporates teachings of the present invention may optionally include a receptacle for an electrical harness, such as the 4-connection and 7-connection electrical plugs that are commonly used, as known in the art, to connect the electrical systems of trailers with those of the vehicles that are being used to haul such trailers.

Various elements of receiver cover 10, 10', 10" of the present invention, including, without limitation, stationary member 12, 12', 12" door 14, 14', 14" and hinge pin 50 of receiver cover 10, may be fabricated by known manufacturing processes. By way of example only, known injection molding techniques may be used to form these and other elements of receiver cover 10 from a thermoplastic material or fiber-reinforced thermoplastic material. As another example, when metal is used to form one or more of the elements of a receiver cover that incorporates teachings of the present invention, known casting or machining processes may be used.

Referring again to FIGS. 1 and 2, as an example of the use of a receiver cover that incorporates teachings of the present invention, such as the depicted receiver cover 10, stationary member 12 may be positioned over an end 103 of a receiver 100, with end 103 being introduced into receiver coupling aperture 32 and abutting ridge 34. Securing screw 27 may then be tightened to secure stationary member 12 to receiver 100.

When access to receiver 100 is desired, as shown in FIG. 8, door 14 may be manually opened by pivoting the same about hinge 18. As door 14 is held in place so as to prevent biasing element 70 (FIG. 6) from moving door 14 back into the closed position over stationary member 12, a trailer hitch 110 is introduced into and coupled with receiver 100, as known in the art. Trailer hitch 110 then prevents biasing element 70 from closing door 14, so door 14 rests on trailer hitch 110.

Once trailer hitch 110 is no longer needed, it may be uncoupled from receiver 100 and removed from receptacle 102 of receiver 100 (See FIG. 2). Biasing element 70 (FIG. 6) may then cause door 14 to be biased toward stationary member 12 and, thus, moved into a closed position over access aperture 22 (FIG. 2) of stationary member 12 and receptacle 102 of receiver 100.

Although the foregoing description includes many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention, is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A receiver cover, comprising:
    a stationary member including a coupling aperture configured to be secured on an end of a receiver and an access aperture through which a receptacle of said receiver is exposed;
    a door positionable over said access aperture; and
    a hinge securing said door to said stationary member, said hinge configured to bias said door toward said stationary member; and
    at least one size-adjustment element configured to be associated with said coupling aperture of said stationary member to reduce an effective size thereof.

2. The receiver cover of claim 1, wherein said hinge includes:
    a substantially planar member; and
    an elongate region of reduced thickness relative to an adjacent region of said substantially planar member to at least one of a fixed hinge member and said door, said elongate region having a relaxed position when said substantially planar member is substantially within a plane of said door and a stressed position when said substantially planar member is removed from said plane of said door.

3. The receiver cover of claim 2, wherein said at least one hinge further includes:

at least one aperture formed through said substantially planar member and configured to receive a tab protruding from said stationary member.

4. The receiver cover of claim 1, wherein said at least one size-adjustment element comprises four substantially planar peripheral walls of substantially equal lengths arranged in a substantially square configuration having outer dimensions that facilitate disposal thereof within said coupling aperture, said four substantially planar peripheral walls defining a reduced-size coupling aperture.

5. The receiver cover of claim 4, wherein said at least one size-adjustment element further includes:

a substantially planar ledge oriented substantially perpendicular relative to planes of said four substantially planar peripheral walls, an inner surface of said substantially planar ledge configured to abut an end of a trailer hitch receiver and an outer surface of said substantially planar ledge configured to abut an inner surface of the receiver cover.

6. The receiver cover of claim 4, wherein at least one wall of said four substantially planar peripheral walls includes two discontinuous sections with a gap therebetween.

7. The receiver cover of claim 1, wherein said stationary member further includes a guide for maintaining said door in a closed position and said door further includes a securing element configured to engage said guide.

8. The receiver cover of claim 7, wherein said guide and said securing element comprise biasing surfaces that are configured to abut one another when said door is in said closed position.

9. The receiver cover of claim 1, further comprising:

a biasing element.

10. The receiver cover of claim 9, wherein said biasing element employs a magnetic field to bias said door toward said stationary member.

11. The receiver cover of claim 1, wherein said stationary member is configured for slight size adjustment.

12. The receiver cover of claim 11, wherein said stationary member comprises a gap in at least one sidewall thereof.

13. A size-adjustment element for a cover for a trailer hitch receiver, comprising:

four substantially planar peripheral walls of substantially equal lengths arranged in a substantially square configuration having outer dimensions that facilitate disposal thereof within a coupling aperture of the cover, said four substantially planar peripheral walls defining a reduced-size coupling aperture.

14. The size-adjustment element of claim 13, further comprising:

a substantially planar ledge oriented substantially perpendicular relative to planes of said four substantially planar peripheral walls, an inner surface of said substantially planar ledge configured to abut an end of said trailer hitch receiver, and an outer surface of said substantially planar ledge configured to abut an inner surface of the cover.

15. The size-adjustment element of claim 13, wherein at least one wall of said four substantially planar peripheral walls includes two discontinuous sections with a gap therebetween.

16. A method for altering an effective size of a coupling aperture of a cover for a receiver of a trailer hitch, comprising:

introducing at least one size-adjustment element including a reduced-size coupling aperture into the coupling aperture, said at least one size-adjustment element having outer dimensions slightly smaller than inner dimensions of the coupling aperture and inner dimensions at least as large as outer dimensions of the receiver.

17. The method of claim 16, further comprising:

introducing at least another size-adjustment element into said reduced-size coupling aperture of said at least one size-adjustment element, a reduced-size coupling aperture of said at least another size-adjustment element having inner dimensions which are about the same as or slightly larger than the outer dimensions of the receiver.

18. The method of claim 16, wherein said introducing comprises slightly adjusting a size of said at least one size-adjustment element.

19. The method of claim 16, further comprising:

selecting said at least one size-adjustment element to have an overall thickness which provides said reduced-size coupling aperture with inner dimensions that are about the same as or slightly larger than the outer dimensions of the receiver.

* * * * *